O. J. & H. ERICKSON.
GRAIN SMUT CLEANER.
APPLICATION FILED JAN. 6, 1914.
1,117,821.
Patented Nov. 17, 1914.
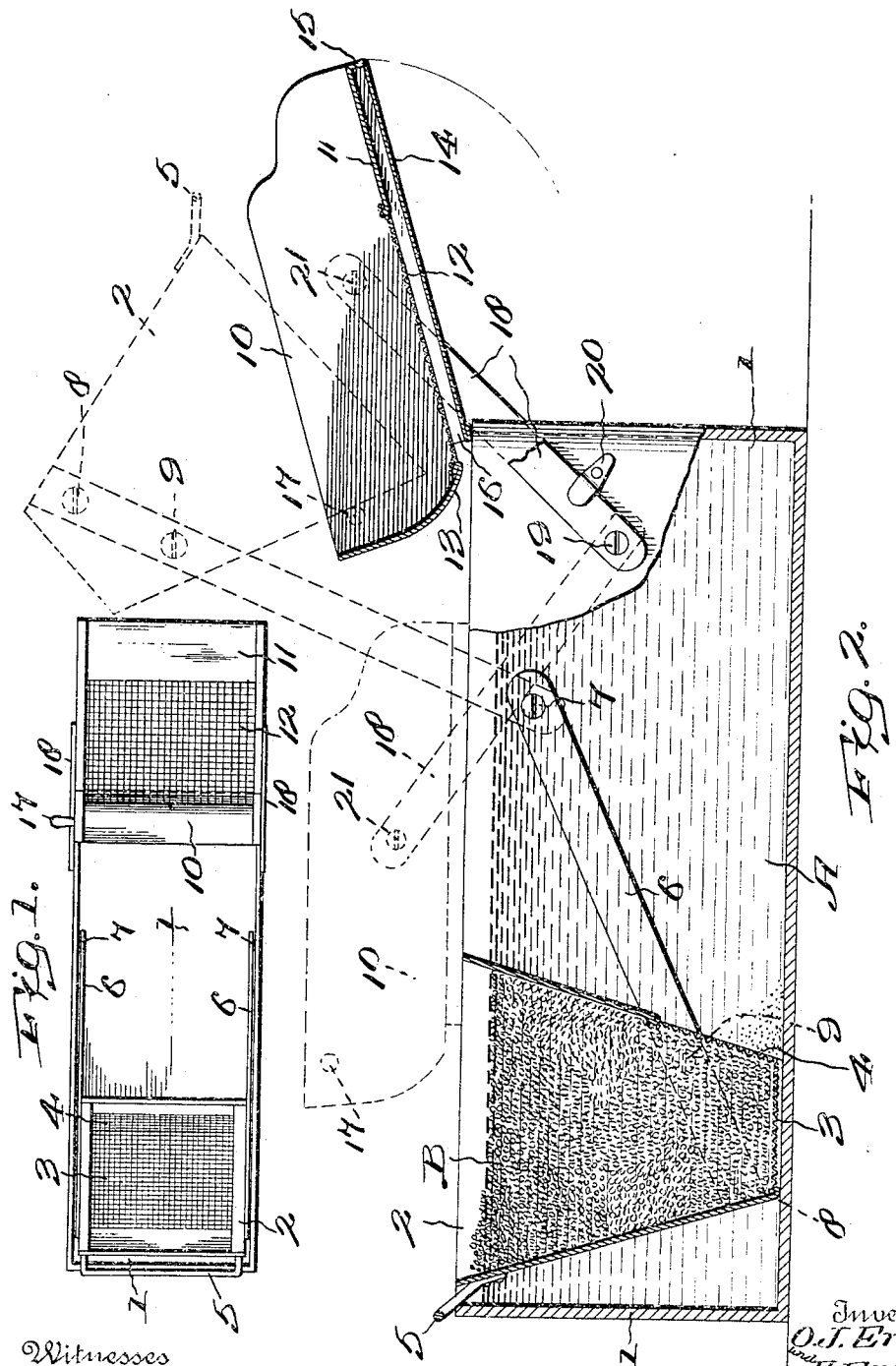

UNITED STATES PATENT OFFICE.

OSCAR J. ERICKSON AND HENRY ERICKSON, OF BENSON, MINNESOTA.

GRAIN-SMUT CLEANER.

1,117,821. Specification of Letters Patent. Patented Nov. 17, 1914.

Application filed January 6, 1914. Serial No. 810,609.

*To all whom it may concern:*

Be it known that we, OSCAR J. ERICKSON and HENRY ERICKSON, citizens of the United States, residing at Benson, in the county of Swift and State of Minnesota, have invented certain new and useful Improvements in Grain-Smut Cleaners; and we do hereby declare the following to be a full, clear, and exact description of the invention, such as will enable others skilled in the art to which it appertains to make and use the same.

Our invention relates to improvements in apparatus for cleaning small grains of smut, or other soluble foreign matter, and it consists in certain novel features hereinafter described and claimed.

Reference is had to the accompanying drawings, in which:—

Figure 1 is a plan view of the apparatus when in the empty condition; and Fig. 2 is a central vertical section, with parts in elevation on a larger scale, showing the apparatus in use.

1 represents the vat, or tank, of any suitable material, in which the box sieve 2 is mounted. This box has screens 3 and 4 at the bottom and partly extending up one side thereof to permit free entrance and draining out of the liquid A held in the vat 1. This box sieve 2 is preferably provided with a handle 5. Arms 6 are pivoted on each side of the vat, on the interior thereof, as at 7, and the free ends of these arms are secured, as at 8 and 9, to the sides of the box sieve. 10 is a second sieve, or receptacle, provided with an inner bottom 11 at its forward end, and with a wire screen 12, and a rear curved portion 13, and also with an outer bottom 14 connected to the inner bottom 11, as at 15, forming a passage between the two bottoms opening as at 16. This sieve 10 is provided with a suitable handle, or handles, 17, and is pivoted, as at 21, on the arms 18, which arms are pivoted, as at 19, to the outside of the vat; and said arms are limited in their forward travel by means of the stops 20, see Fig. 2. This sieve 10 is ordinarily in the position shown in full lines in Fig. 2, but may be tilted about its pivot as indicated in curved dotted lines in Fig. 2; while for purposes of transportation the arms 18 may be swung backward causing the sieve 10 to rest on top of the box 1, as shown in dotted lines in Fig. 2.

The operation of the device is as follows: The vat 1 being filled with liquid A to the desired height, the box sieve 2 is filled with the grain B to approximately the level of the top of the liquid in the vat. After it has soaked the desired length of time, the box sieve is swung up about the pivot 7, as shown in dotted lines in Fig. 2, and its contents are dumped into the sieve 10, where the liquid is allowed to drain through the screen 12 and the opening 16 back into the vat 1. After the liquid has been sufficiently drained out, the sieve 10 is tilted about its pivot 21 and its contents are dumped onto any suitable conveyer, or into any suitable receptacle, not shown. After the first charge has been dumped from the box sieve 2 into the sieve 10, the process may be continued indefinitely; the grain being poured into the box sieve and being saturated with the liquid while therein, while the grain in the sieve 10 is being drained through the screen 12.

It will be obvious that various modifications might be made in the herein described apparatus, and in the construction, combination and arrangement of parts which could be used without departing from the spirit of our invention.

Having thus described our invention what we claim and desire to secure by Letters Patent of the United States is:—

1. An apparatus of the character described comprising a single vat adapted to contain liquid, a box sieve pivotally mounted within said vat, to swing into and out of same, a second sieve mounted above said vat and adapted to receive the contents of the first sieve, and pivoted means for tilting said second sieve, substantially as described.

2. An apparatus of the character described, comprising a single vat, adapted to contain liquid, arms pivoted within said vat, a box rigidly attached to said arms and having wire screens in the bottom thereof, arms pivoted to the exterior of said vat and projecting upwardly therefrom, and a second sieve pivoted to said second arms and provided with a bottom passage beneath said sieve, adapted to drain into said vat, substantially as described.

3. An apparatus of the character described, comprising a single vat adapted to contain liquid, arms pivoted within said vat, a box rigidly attached to said arms and having a wire screen in the bottom and a wire screen in the forward lower edge thereof, arms pivoted to the exterior of said vat and projecting upwardly therefrom, and a second sieve pivoted to said second arms, and provided with a bottom passage beneath said sieve having its forward end closed and its rear end open to drain into said vat, substantially as described.

4. An apparatus of the character described, comprising a single vat adapted to contain liquid, arms pivoted within said vat, a box rigidly attached to said arms and having wire screens in the bottom thereof, arms pivoted to the exterior of said vat and projecting upwardly therefrom, and a second sieve pivoted to said second arms provided with a double bottom closed at its forward end and open at its rear end to drain into said vat, substantially as described.

5. An apparatus of the character described, comprising a single vat adapted to contain liquid, arms pivoted within said vat, a box rigidly attached to said arms and having wire screens in the bottom thereof, arms pivoted to the exterior of said vat and projecting upwardly therefrom, and a second sieve pivoted to said second arms provided with a double bottom closed at its forward end and open at its rear end to draw into said vat, and a handle for tilting said second sieve, substantially as described.

6. An apparatus of the character described, comprising a single vat adapted to contain liquid, arms pivoted within said vat, a box rigidly attached to said arms and having wire screens in the bottom thereof, arms pivoted to the exterior of said vat and projecting upwardly therefrom, and a second sieve pivoted to said second arms provided with a double bottom closed at its forward end and open at its rear end to draw into said vat, a handle for tilting said second sieve, and stops provided to engage said second arms and hold said second sieve at the edge of said vat, substantially as described.

In testimony whereof, we affix our signatures, in presence of two witnesses.

OSCAR J. ERICKSON.
HENRY ERICKSON.

Witnesses:
C. L. KANE,
R. P. JOHNSON.

Copies of this patent may be obtained for five cents each, by addressing the "Commissioner of Patents, Washington, D. C."